(12) United States Patent
Casati et al.

(10) Patent No.: US 9,386,554 B2
(45) Date of Patent: Jul. 5, 2016

(54) METHOD OF PROVIDING LOCATION UPDATE MESSAGES AND PAGING MESSAGES IN A WIRELESS COMMUNICATION SYSTEM

(75) Inventors: Alessio Casati, Swindon (GB); Sudeep Palat, Grange Park (GB); Said Tatesh, Swindon (GB)

(73) Assignee: GEMALTO SA, Meudon (FR)

( * ) Notice: Subject to any disclaimer, the term of this patent is extended or adjusted under 35 U.S.C. 154(b) by 1512 days.

(21) Appl. No.: 12/221,887

(22) Filed: Aug. 7, 2008

(65) Prior Publication Data

US 2009/0098884 A1    Apr. 16, 2009

Related U.S. Application Data

(63) Continuation of application No. PCT/US2007/061600, filed on Feb. 5, 2007.

(30) Foreign Application Priority Data

Feb. 7, 2006    (GB) .................................. 0602403.8

(51) Int. Cl.
| | | |
|---|---|---|
| *H04W 64/00* | (2009.01) | |
| *H04W 60/04* | (2009.01) | |
| *H04W 68/00* | (2009.01) | |
| *H04W 88/06* | (2009.01) | |
| *H04W 92/02* | (2009.01) | |

(52) U.S. Cl.
CPC .............. *H04W 60/04* (2013.01); *H04W 68/00* (2013.01); *H04W 88/06* (2013.01); *H04W 92/02* (2013.01)

(58) Field of Classification Search
CPC ..... H04W 60/04; H04W 68/00; H04W 88/06; H04W 92/02
USPC ..................... 455/432.1–453, 456.1–457, 458
See application file for complete search history.

(56) References Cited

U.S. PATENT DOCUMENTS

| | | | |
|---|---|---|---|
| 6,397,065 B1 * | 5/2002 | Huusko et al. ............. | 455/435.2 |
| 7,039,430 B2 | 5/2006 | Kang et al. | |
| 2004/0185879 A1 * | 9/2004 | Kong et al. ................... | 455/458 |
| 2007/0149206 A1 * | 6/2007 | Wang et al. .................... | 455/450 |

FOREIGN PATENT DOCUMENTS

| | | | | |
|---|---|---|---|---|
| JP | 11341545 | 12/1999 | ............... | H04Q 7/34 |
| JP | 3944106 B2 | 7/2007 | | |

* cited by examiner

*Primary Examiner* — Babar Sarwar
(74) *Attorney, Agent, or Firm* — The Jansson Firm; Pehr B. Jansson (57) ABSTRACT

The present invention provides a method of operating an idle mobile unit that is capable of communicating with first and second wireless communication systems. One embodiment of the method includes providing a location update message in response to the idle mobile unit transitioning from a first tracking area associated with the second wireless communication system to a second tracking area associated with the second wireless communication system. The first and second wireless communication systems are capable of paging the idle mobile unit following the location update message.

44 Claims, 4 Drawing Sheets

METHOD OF PROVIDING LOCATION UPDATE MESSAGES AND PAGING MESSAGES IN A WIRELESS COMMUNICATION SYSTEM

CROSS REFERENCE TO RELATED APPLICATIONS

This application is a continuation of International Application PCT/US2007/061600 filed Feb. 5, 2007, which claims priority to foreign application GB 0602403.8, filed Feb. 7, 2006.

BACKGROUND OF THE INVENTION

1. Field of the Invention

This invention relates generally to communication systems, and, more particularly, to wireless communication systems.

2. Description of the Related Art

Wireless communication systems typically include one or more base stations or access points, which are part of the mobile network, for providing wireless connectivity to mobile units in a geographic area (such as a cell or sector) associated with each base station or access point. To initiate communication between a mobile unit and a base station, the mobile unit and the base station must establish a session. For this, the mobile unit attaches to the network, thereby creating in the network a "UE context" that includes information indicating values of various session parameters. UE context information may be transferred from one base station (or other network node) to another as the mobile unit moves between the cells, e.g., as part of a handover algorithm. Once a UE context has been established between the mobile unit and the base station, the mobile unit and the base station may form a wireless communication link, or air interface, which may be used to transmit modulated radiofrequency signals based on the session parameters. The air interface includes downlink (or forward link) channels for transmitting information from the base station to the mobile unit and uplink (or reverse link) channels for transmitting information from the mobile unit to the base station. The uplink and downlink channels are typically divided into data channels, random access channels, broadcast channels, paging channels, control channels, and the like.

Establishment of the communication session and/or wireless communication link is performed according to wireless communication standards and/or protocols. For example, members of the Third Generation Partnership Project (3GPP, 3GPP2) establish and agree to standards and/or protocols that may then be adopted by service providers for implementing their wireless communication systems. Adopting the agreed-upon standards and/or protocols permits service providers to cooperate in providing wireless communication service to subscribers. Examples of current and legacy wireless communication systems include General Packet Radio Source (GPRS) systems that operate according to the second and/or third generations (2G and 3G) of the 3GPP standards and/or protocols. The 3G systems may also be referred to as Universal Mobile Telecommunication Systems (UMTS). New standards and/or protocols, such as the Long Term Evolution/System Architecture Evolution (LTE/SAE) standards and/or protocols, are currently under discussion by the 3GPP.

Mobile units may have an active or an idle wireless communication link with one or more base stations. Active communication links are used when the mobile unit is actively transmitting and/or receiving information from the base station. When an active mobile unit moves, it may be handed off from a source base station to a target base station. Active mobile units may also be handed off from a source base station to a target base station when the quality of the wireless communication link to the source base station falls below the quality of a wireless communication link of a target base station due to changes in environmental conditions and/or transmission parameters of the source and/or target base stations. In the idle mode, a mobile unit may periodically reselect a preferred base station and synchronize to the corresponding broadcast paging interval. However, the idle mobile unit need not inform the new base station that it has been selected as the preferred base station. Thus, states associated with the mobile unit may not be moved until the mobile unit leaves the idle mode when forward link and/or reverse link traffic resumes.

When information becomes available for an idle mobile unit the wireless communication system transmits a paging message indicating that the information is available and requesting that the mobile unit enter the active mode to receive the information. However, as discussed above, idle mobile units are not required to notify base stations when they have been selected as the preferred base station. Consequently, the wireless communication system may not know the exact location of the idle mobile unit and therefore may be required to provide paging messages to numerous cells or sectors. Conventional wireless communication systems attempt to balance the competing desire to reduce overhead associated with transmitting location update messages and the desire to reduce overhead associated with transmitting paging messages by defining tracking areas that include a plurality of cells or sectors served by a plurality of base stations. Idle mobile units may then be required to transmit a location update message when it crosses the boundary between two tracking areas. Thus, the wireless communication system knows that the idle mobile unit is most likely within the tracking area indicated in the most recent location update message and so may begin the paging processed by providing paging messages via the base stations within the tracking area.

In the real world, wireless connectivity is provided to mobile units using multiple wireless communication systems, some of which may operate according to the most recent standards and/or protocols and some of which may operate according to one or more legacy standards and/or protocols. For example, the new LTE/SAE wireless communication system may be initially deployed by overlaying the system with existing legacy 2G/3G/UMTS wireless communication systems. The new and legacy wireless communication systems utilize different radio interface technologies that operate according to different standards and/or protocols. The legacy 2G/3G/UMTS wireless communication systems are expected to be, at least initially, more mature than the new LTE/SAE wireless communication systems and therefore the legacy wireless communication systems are expected to provide, at least initially, better and more reliable coverage. Consequently, mobile units are likely to utilize legacy wireless communication systems when coverage from the new wireless communication system is lost or not available.

Transitions between new and legacy wireless communication systems may generate a relatively large amount of signaling traffic, at least in part because both the new and legacy wireless communication systems may define overlapping sets of tracking areas. Consequently, the mobile unit may need to provide two location update messages every time it crosses a boundary between tracking areas associated with the new and/or legacy wireless communication systems. For example, if the mobile unit transitions from a tracking area associated with the new wireless communication system into a tracking area associated with the legacy wireless communication system, the mobile unit may provide location update messages to both the new and the legacy wireless communication system. The transitions may be the result of movement of the mobile unit, e.g., when a roaming mobile unit crosses a boundary between coverage areas of the new and legacy wireless communication systems, or the result of changing system or environmental conditions, e.g., when the channel quality provided by the new and/or legacy wireless communication system changes and triggers a transition between the new and legacy wireless communication systems.

The amount of signaling traffic generated by location update messages may also be particularly large when the new wireless communication system is first deployed because the coverage provided by the new wireless communication system may be patchy, resulting in relatively large numbers of transitions between the new and legacy wireless communication systems. The number of calls that are dropped by the new and/or legacy wireless communication systems may increase when the signaling traffic increases. Accordingly, the number of call drops may be undesirably large when the new wireless communication system is first deployed. Furthermore, a tracking area update triggered by a location update message that is transmitted by transitions between tracking areas maintained by different wireless communication systems results in the source wireless communication system releasing information (also known as a context) associated with the mobile unit. This context information must be re-created if the mobile unit transitions back to the original wireless communication system, which may lead to excessive resource consumption if the mobile unit frequently flip-flops between different wireless communication systems.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for operating an idle mobile unit that is capable of communicating with first and second wireless communication systems. One embodiment of the method includes providing a location update message in response to the idle mobile unit transitioning from a first tracking area associated with the second wireless communication system to a second tracking area associated with the second wireless communication system. The first and second wireless communication systems are capable of paging the idle mobile unit following the location update message.

In another embodiment of the present invention, a method is provided for paging an idle mobile unit that is capable of communicating with first and second wireless communication systems. The method may include providing a paging message via a first tracking area associated with the first wireless communication system and a first tracking area associated with the second wireless communication system. The tracking areas are indicated in at least one location update message provided by the idle mobile unit in response to the idle mobile unit transitioning to the first tracking area associated with the second wireless communication system.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 1:
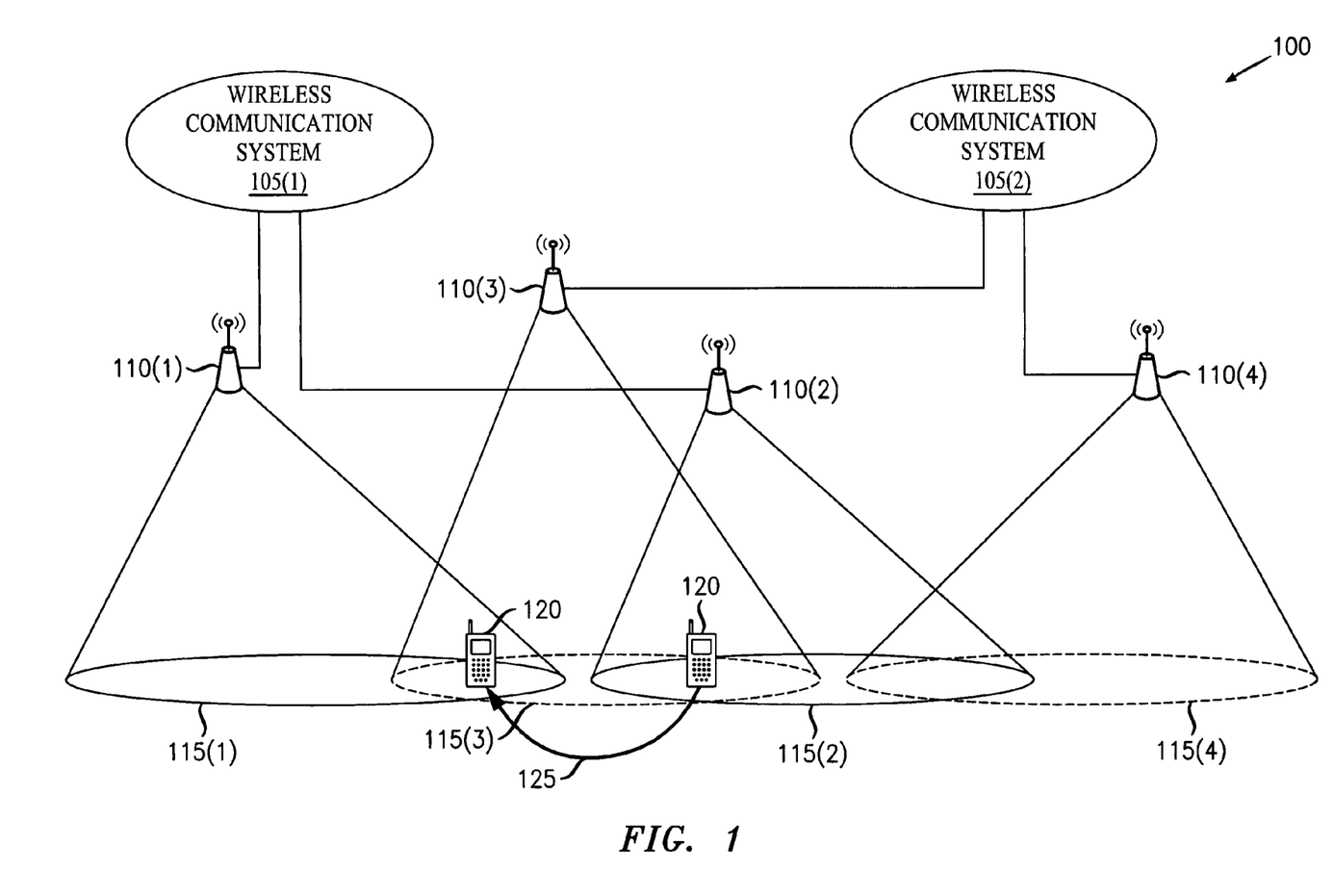
FIG. 1 conceptually illustrates one exemplary embodiment of a communication system, in accordance with the present invention.

FIG. 1 conceptually illustrates one exemplary embodiment of a communication system 100. In the illustrated embodiment, the communication system 100 includes two wireless communication systems 105(1-2) for providing wireless connectivity. The distinguishing indices (1-2) may be used to indicate individual wireless communication systems 105(1-2) and/or subsets thereof. However, the distinguishing indices (1-2) may be dropped when referring to the wireless communication systems 105 collectively. This convention may also be applied to other elements shown in the drawings and indicated by a numeral and one or more distinguishing indices. Persons of ordinary skill in the art having benefit of the present disclosure should appreciate that the selected number of wireless communication systems 105 is illustrative and that the present invention is not limited to systems 100 that only include two wireless communication systems 105. In alternative embodiments, the communication system 100 may include any number of wireless communication systems 105.

The wireless communication systems 105 operate according to different radio interface technologies. As used herein, the term "radio interface technology" will be understood to refer to the standards and/or protocols that are implemented by the wireless communication systems 105 to provide wireless connectivity, as well as the hardware, firmware, and/or software that are used by the wireless communication systems 105 to implement the standards and/or protocols and provide wireless connectivity. In the illustrated embodiment, the wireless communication system 105(1) operates according to a legacy radio interface technology. As used herein, the term "legacy" refers to radio interface technologies that operate according to standards and/or protocols that have been released and/or deployed prior to the most current radio interface technology. For example, the wireless communication system 105(1) may implement the Second Generation (2G) General Packet Radio Source (GPRS) standards and/or protocols, which have been defined by the Third Generation Partnership Project (3GPP). For another example, a wireless communication system 105(2) may implement the Third Generation (3G) GPRS standards and/or protocols defined by the Third Generation Partnership Project (3GPP). The 3G standards and/or protocols may also be referred to as the Universal Mobile Telecommunication System (UMTS) standards and/or protocols.

The wireless communication system 105(2) operates according to a radio interface technology that differs from the radio interface technology implemented by the wireless communication system 105(1). In the illustrated embodiment, the wireless communication system 105(2) implements the most current (new) radio interface technology. For example, the wireless communication system 105(2) may implement the Long Term Evolution/System Architecture Evolution (LTE/SAE) standards and/or protocols under discussion by the 3GPP. The new radio interface technology implemented by the wireless communication system 105(2) operates according to standards and/or protocols that may not be supported or recognized by legacy radio interface technologies implemented by the wireless communication system 105(1). Similarly, the legacy radio interface technology implemented by the wireless communication system 105(1) operates according to standards and/or protocols that may not be supported or recognized by the new radio interface technology implemented by the wireless communication system 105(2).

The wireless communication systems 105 provide wireless connectivity via one or more base stations 110. However, the present invention is not limited to providing wireless connectivity via base stations 110. In alternative embodiments, the wireless communication systems 105 may provide wireless connectivity via other entities such as access points, access networks, base station routers, and the like. Each of the base stations 110 provides wireless connectivity to a geographic area or cell 115. Although the cells 115 in FIG. 1 are depicted as being approximately circular and at least partially overlapping, the topology of actual cells 115 may be irregular (as well as time varying) and the shapes of the cells 115 may depend upon environmental conditions and the transmission and/or reception parameters adopted by the base stations 110. In one embodiment, the base stations 110 may include directional antennas that permit the base stations 110 to provide wireless connectivity independently and concurrently to one or more sectors within the associated cells 115.

The base stations 110 and the associated cells 115 may be used to define one or more tracking areas. In the interest of clarity and to avoid obscuring the present invention, each cell 115 shown in FIG. 1 is considered a tracking area 115. However, persons of ordinary skill in the art having benefit of the present disclosure should appreciate that the present invention is not limited to this specific embodiment. In alternative embodiments, each tracking area 115 may include more than one cell associated with more than one base station 115. For example, typical wireless communication systems 100 provide wireless connectivity to tracking areas 115 that include several cells that are served by several base stations 110. Accordingly, the base stations 110 and cells/tracking areas 115 shown in FIG. 1 may also be representative of more than one base station and associated cell that may form each tracking area 115.

In the illustrated embodiment, a mobile unit 120 has established a session with the wireless communication system 105(1). For example, the mobile unit 120 may have previously initiated the session with the base station 110(2) and/or another entity in the wireless communication system 105(1), such as a radio network controller (not shown). The mobile unit 120 and the wireless communication system 105(1) may then have formed, exchanged, and/or negotiated session establishment information that may be used to establish the session. The session establishment information may also be referred to as a "context." For example, when the wireless communication system 105(1) operates according to 2G or 3G/UMTS standards and/or protocols, the session establishment information includes a Packet Data Protocol (PDP) context that may be used to define aspects of the session such as routing, quality of service, security, billing, and the like. The PDP context is a logical association between the mobile unit 120 and a public data network running across a GPRS network, such as the wireless communication system 105(1). Each PDP context includes information such as an associated PDP address, an access point name (APN) that includes routing information, a Quality of Service (QoS) for the session, a network service access point identifier (NSAPI) that is an index to the PDP context that is using services provided by other layers, a transaction identifier (TI) that is used to distinguish multiple bidirectional message flows for a given connection, and the like. The PDP context may also be used to establish a radio bearer between the mobile unit 120 and the base station 110(2).

The mobile unit 120 is also associated with one or more tracking areas 115. For example, the mobile unit 120 may be associated with UTRAN registration area (URA) defined by the 2G/3G standards and/or protocols. The wireless communication systems 105 and the mobile unit 120 may therefore maintain information that indicates the tracking areas 115 that contain the mobile unit 120. For example, the wireless communication systems 105 may include an identifier that indicates the tracking area 115 associated with the mobile unit 120. The tracking areas 115 associated with the wireless communication system 105 may overlap, at least in part, so that both wireless communication systems 105 may have a record of the mobile unit 120 and the tracking areas 115 that include the mobile unit 120. In the illustrated embodiment, the tracking areas 115(1-2) associated with the wireless communication system 105(1) overlap with the tracking areas 115(3-4) associated with the wireless communication system 105(2). The mobile unit 120 is initially associated with the tracking areas 115(2-3) and so the wireless communication systems 105 may include information indicating one or more of the tracking areas 115(2-3) that include the mobile unit 120, as will be discussed in detail below. The mobile unit 120 may also include information indicating the associated tracking areas 115(2-3).

After establishing the session with the wireless communication system 105(1) the mobile unit 120 depicted in FIG. 1 enters an idle mode. In one embodiment, the base station 110(2) may initiate the idle mode by transmitting a de-registration message to the mobile unit 120. The serving base station 110(2) may then tear down the traffic channel associated with the idle mobile unit 120 and release all information pertaining to the idle mobile unit's network connections. The idle mobile unit 120 may only listen while in the idle mode and can only receive messages from its preferred base station. The media access control (MAC) state information for the session may also be torn down when the mobile unit 120 enters the idle mode, e.g., if the mobile unit explicitly de-registers its MAC state for the duration of the idle state. Persons of ordinary skill in the art having benefit of the present disclosure should appreciate that the idle modes or states described in this document may include paging states, such as Packet Mobility Management (PMM) Idle, Long Term Evolution (LTE)-Idle, or UTRAN Registration Area (URA)-PCH.

The wireless communication systems 105 may reach the idle mobile unit 120 by providing a paging message, e.g., a message indicating that information is available for the mobile unit 120 and requesting that the mobile unit 120 move to the active state. For example, an idle mobile unit 120 that is located in a URA and is in the URA-PCH paging state and may be reachable by paging over a paging channel (PCH).

The idle mobile unit 120 may move or transition between base stations 110 and/or tracking areas 115 associated with the different wireless communication systems 105, as indicated by the arrow 125. In the illustrated embodiment, the mobile unit 120 moves from the tracking area 115(2) associated with the base station 110(2) in the wireless communication system 105(1) to the tracking area 115(3) associated with the base station 110(3) in the wireless communication system 105(2). For example, the mobile unit 120 may transition from the legacy (2G/3G) wireless communication system 105(1) to the new (LTE/SAE) wireless communication system 105(2). Persons of ordinary skill in the art should appreciate that the "move" may be the result of actual movement of the mobile unit 120 and/or changing environmental or transmission conditions. In one embodiment, the transition may result in the mobile unit 120 selecting, or camping on, a new preferred base station 110. For example, the mobile unit 120 elect to camp on the base station 110(3) based on a comparison of pilot signal strengths of the base stations 110(2-3). Alternatively, the mobile unit 120 may remain camped on the base station 110(3) even though the transition indicated by the arrow 125 results in the mobile unit 120 crossing a tracking area boundary between the tracking areas 115(1-2) associated with the wireless communication system 105(1).

The idle mobile unit 120 may provide one or more location update messages to one or more of the wireless communication systems 105 to inform the wireless communication systems 105 that it has entered one or more new tracking areas 115. In one embodiment, the mobile unit 120 provides a location update message when it transitions from a tracking area 115 associated with one wireless communication system 105 to a different tracking area associated with the same wireless communication system 105. However, both of the wireless communication systems 105 may want to be able to page the idle mobile unit and so the location update information is provided in a manner that allows both wireless communication systems 105 to remain aware of the current tracking areas 115 for the corresponding systems 105. Both wireless communication systems 105 therefore remain able to page the idle mobile unit 120 following the location update message. For example, if the idle mobile unit 120 that is initially in a 2G/3G URA-PCH state in the tracking area 115(2) and is also in the tracking area 115(3) subsequently camps on the base station 110(4) in the tracking area 115(4) associated with the wireless communication system 105(2), then the idle mobile unit 120 may provide a location update message over the wireless communication system 105(2) and remain in the 2G/3G URA-PCH state in the wireless communication system 105(1). For another example, if the idle mobile unit 120 transitions between the tracking areas 115(1-2) while remaining camped in the tracking area 115(3), then the idle mobile unit 120 may provide a location update message via the wireless communication system 105(2) that includes identifiers for the tracking areas 115(2-3).

Figure 2A:
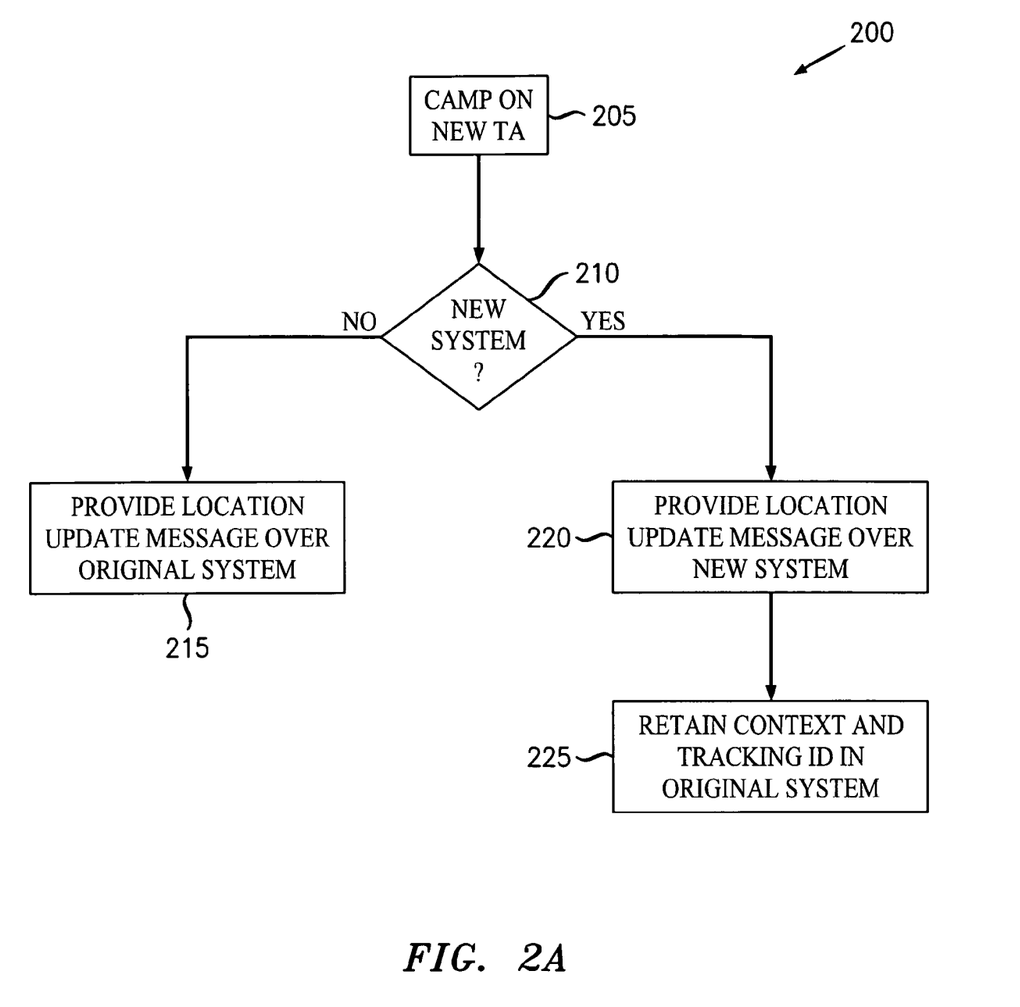
FIG. 2A conceptually illustrates a first exemplary embodiment of a method for providing location update messages, in accordance with the present invention.

FIG. 2A conceptually illustrates a first exemplary embodiment of a method 200 for providing location update messages. In the illustrated embodiment, an idle mobile unit, such as the mobile unit 120 shown in FIG. 1, is registered in two wireless communication systems that operate using different radio interface technologies. For example, the mobile unit may be registered in a first wireless communication system that operates according to 2G/3G standards and/or protocols and a second wireless communication system that operates according to LTE/SAE standards and/or protocols. In one embodiment, one of the wireless communication systems acts as the proxy for an interface to a home location register (HLR). The information from the HLR may then be kept up to date in both wireless communication systems. In the illustrated embodiment, the idle mobile unit is initially camped on a tracking area associated with one of the wireless communication systems. For example, the idle mobile unit may initially be camped on a tracking area associated with the 2G/3G wireless communication system and therefore may be in a URA-PCH state. As discussed above, the idle mobile unit may also be associated with a tracking area of the other wireless communication system, such as an LTE/SAE wireless communication system. In the illustrated embodiment, both wireless communication systems retain a context for the idle mobile unit. The wireless communication systems also include information indicating the tracking area that was most recently reported by the mobile unit to the corresponding wireless communication system.

The idle mobile unit may then camp (at 205) on a new tracking area and determine (at 210) whether the tracking area is associated with the original wireless communication system or a different wireless communication system. If the new tracking area is associated with the same wireless communication system as the original tracking area, then the idle mobile unit provides (at 215) a location update message over the original wireless communication system, which may use the location update message to update the information indicating the current tracking area associated with the mobile unit. If the idle mobile unit determines (at 210) that it has camped on a tracking area associated with a different wireless communication system, then the idle mobile unit may provide (at 220) a location update message over the new wireless communication system. For example, if the idle mobile unit that initially camped in the 2G/3G wireless communication system camps (at 205) on a tracking area associated with the LTE/SAE wireless communication system, and the idle mobile unit may provide (at 220) a location update message over the LTE/SAE wireless communication system.

In the illustrated embodiment, both wireless communication systems retain (at 225) their respective contexts for the idle mobile unit. Thus, the tracking area update provided (at 220) over the new wireless communication system does not result in the release of the context in the other system. Both the mobile unit and the network retain (at 225) full information required for both wireless communication systems. The location update message provided (at 220) over the new wireless communication system also does not change the paging state of the idle mobile unit in the other wireless communication system. For example, mobile units are not taken out of the URA-PCH state in UMTS when the location update message is provided via an overlaid LTE/SAE wireless communication system. The idle mobile units may then be paged using both wireless communication systems because both systems have retained (at 225) the context and tracking area identifier that may be used to page the mobile unit.

Figure 2B:
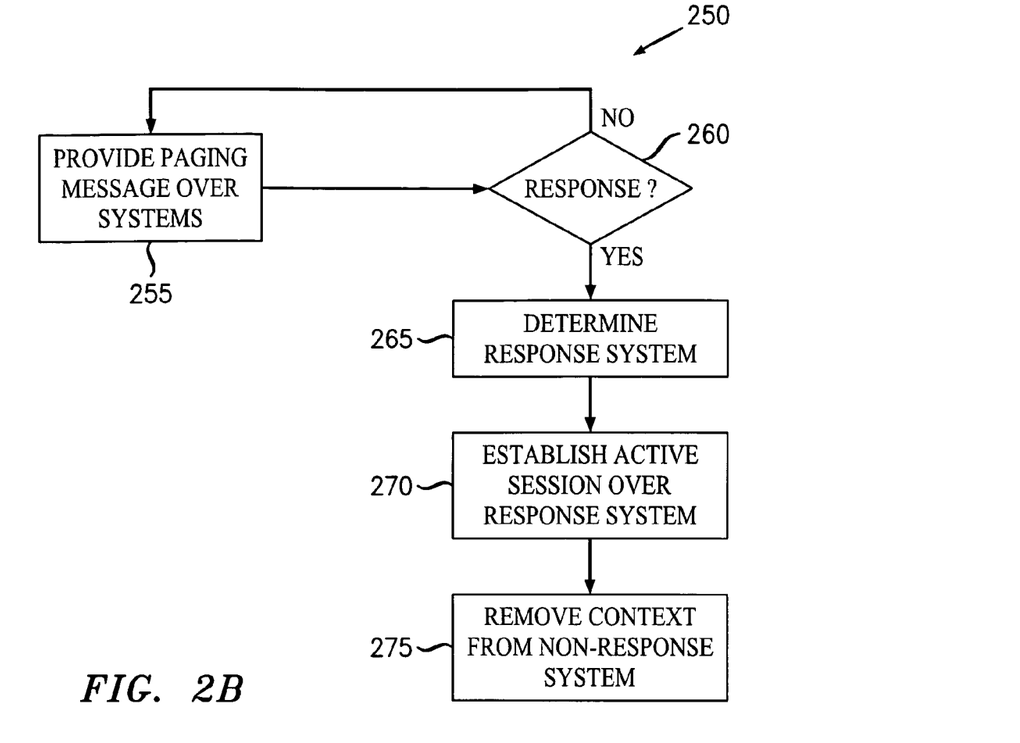
FIG. 2B conceptually illustrates a first exemplary embodiment of a method for paging an idle mobile unit, in accordance with the present invention.

FIG. 2B conceptually illustrates a first exemplary embodiment of a method 250 for paging an idle mobile unit. In the illustrated embodiment, paging messages are provided (at 255) by to wireless communication systems that operate according to different radio interface technologies. The idle mobile unit context and/or tracking area identifiers associated with each of the wireless communication systems are used to determine the tracking areas for the page (at 255) of the idle mobile unit. The wireless communication systems then determine (at 260) whether a response has been received from the idle mobile unit, e.g. using one or more timers. If no response is received (at 260), then the wireless communication systems may provide (at 255) additional paging messages via other tracking areas that are determined based upon the last-reported tracking areas.

If a response to the paging messages is received (at 260), and the idle mobile unit requests establishment of resources for an active session with one of the wireless communication systems, then the wireless communication system that is used to request establishment of resources is determined (at 265). The active session is established (at 270) with the mobile unit over the wireless communication system that was used to transmit the response. For example, if the mobile unit transmitted the request for resources over the LTE/SAE wireless communication system, then the active session may be established (at 270) with the LTE/SAE wireless communication system. In one embodiment, additional information may be transferred to the responding wireless communication system from the other system. The context may then be removed (at 275) from the non-responding wireless communication system. Removing (at 275) the context may include a tear down of the resources in the non-responding system, which may lead to a simpler state because the context of the active mobile unit is only held in one of the wireless communication systems. This may also remove dependencies on subsequent handovers. For example, if the mobile unit established the bearers in LTE/SAE, the URA-PCH state in UMTS is removed. Persons of ordinary skill in the art having benefit of the present disclosure should appreciate that an analogous method may be used when the active session is formed in response to a request from the idle mobile unit that was initiated by the mobile unit.

In one embodiment, the wireless communication systems may also retain the mobile unit contexts when the mobile unit is in the active state: Thus, a change over to active in one system does not result in a tear down of resources in the other system. In this embodiment, multiple handover procedures may be defined depending on the previous states in each system. For example, if the mobile unit was in URA-PCH in one radio network controller (RNC) while in LTE-Active mode and the mobile unit then moves to a cell in another RNC. Such a handover can be modeled as a change within UMTS from URA-PCH in one RNC to active in another RNC and the LTE context may be retained in a "dormant" state.

Figure 3A:
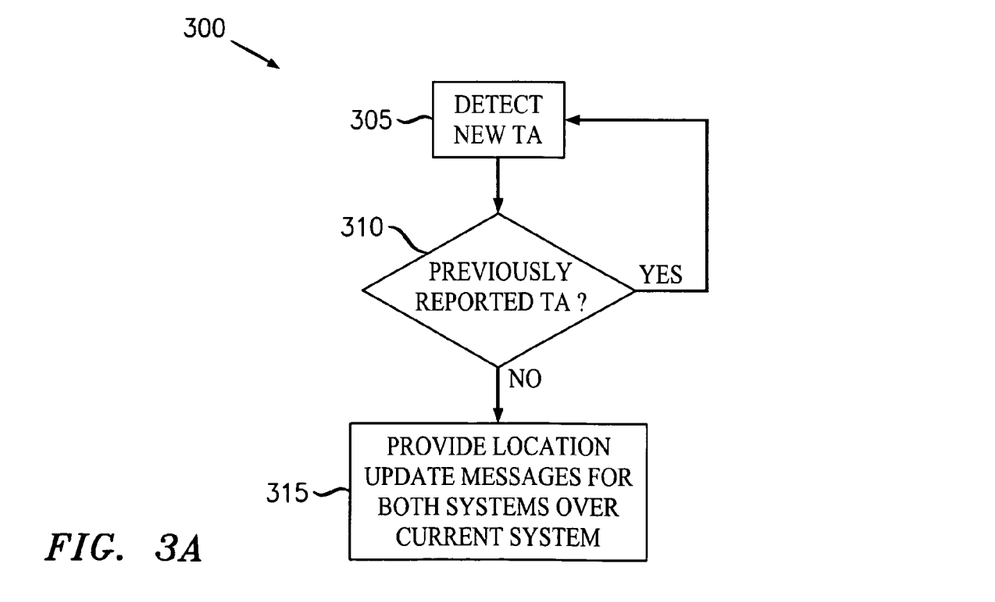
FIG. 3A conceptually illustrates a second exemplary embodiment of a method for providing location update messages, in accordance with the present invention.

FIG. 3A conceptually illustrates a first exemplary embodiment of a method 300 for providing location update messages. In the illustrated embodiment, an idle mobile unit, such as the mobile unit 120 shown in FIG. 1, is registered in two wireless communication systems that operate using different radio interface technologies. In the second exemplary embodiment, only one system retains the mobile unit context, as well as the tracking areas for the wireless communication systems. For example, the mobile unit context may be stored in a wireless communication system that supported the last active session associated with the mobile unit. The other wireless communication system stores a mobile unit identifier and the tracking areas for the wireless communication systems. When the idle mobile unit is camped in one wireless communication system, mobile unit activity in the other system removes the context in the original wireless communication system so that the mobile unit context is retained in only one system.

As discussed above, the mobile unit may move or transition between different tracking areas which may or may not be associated with different wireless communication systems. If the mobile unit detects (at 305) that it is in a new tracking area of one of the wireless communication systems, the mobile unit then determines (at 310) whether the new tracking area is one of the previously reported tracking areas associated with the wireless communication systems. If the new tracking area is one of the previously reported tracking areas, indicating that the mobile unit has moved from the previously reported tracking area of one system into the previously reported tracking area of the other system, then no location update message is sent and the mobile unit waits to detect (at 305) another new tracking area. The mobile unit may therefore move freely between the two wireless communication systems as long as it remains within one of the previously reported tracking areas.

If the mobile unit determines, possibly by continuously scanning both technologies, (at 310) that the new tracking area is not one of the previously reported tracking areas associated with the wireless communication systems, and the mobile unit provides (at 315) a location update message over the current system. For example, if the mobile unit is camped in a 2G/3G wireless communication system when it enters the URA-PCH or idle state, the mobile unit monitors tracking areas associated with both the 2G/3G wireless communication system and the LTE/SAE wireless communication system. If the mobile unit determines (at 310) that it has entered a new tracking area for the LTE/SAE wireless communication system that is different than the previously reported tracking area for the LTE/SAE wireless communication system, then mobile unit may provide (at 315) a location update message including information indicating the new tracking area. The location update message may be provided (at 315) using the original system, which in the example above is the 2G/3G wireless communication system. In one embodiment, the LTE/SAE tracking area information is passed to the user plane equipment (UPE) or the node where the user context is stored. This does not necessarily mean that the mobile unit has registered with the LTE/SAE system.

Similarly, if the mobile unit was originally camped in a tracking area associated with the LTE/SAE wireless communication system, then the mobile unit cannot be in URA-PCH in UMTS since only one system stores the mobile unit context and, in this example, the mobile unit context is stored in the LTE/SAE wireless communication system. In this case, the mobile unit provides the UMTS Routing area over LTE/SAE system. Thus, if the mobile unit determines (at 310) that it has entered a new tracking area for the 2G/3G wireless communication system that is different than the previously reported tracking area for the 2G/3G wireless communication system, then mobile unit may provide (at 315) a location update message including information indicating the new tracking area. The location update message may be provided (at 315) using the original system, which in this example is the LTE/SAE wireless communication system.

In one variation of the second exemplary embodiment, continuous background scanning in the other technology may be avoided if the mobile unit only checks subsequent LTE/SAE tracking areas when it camps on LTE/SAE. Thus for example, the mobile unit may report the LTE/SAE tracking area when it updates the URA-id over the UMTS wireless communication system. The mobile unit may then be allowed to move between the tracking areas in UMTS and LTE/SAE as discussed above. If the mobile unit camps on an LTE/SAE cell that is not the reported tracking area, then it performs a tracking area update over the LTE/SAE wireless communication system, which may remove the mobile unit context from the 2G/3G wireless communication system.

In one variation of the second exemplary embodiment, a temporary identifier may be allocated in both wireless communication systems but carried to the mobile unit over only one system. For example, the temporary identifier may be carried to the mobile unit over the same technology in which the mobile unit performed the tracking update signaling. Thus if the mobile unit is in UMTS URA-PCH state, and it includes an LTE/SAE tracking area, an LTE/SAE mobile unit identifier is allocated to the mobile unit and carried over the UMTS system itself. When there is a need for paging the mobile unit, the tracking area identifier of the respective system can then be used. If keeping the mobile unit in URA-PCH all the time is not considered that critical and mobile units can be in PMM Idle, then the UE context to be retained in UMTS is only the SGSN context.

Figure 3B:
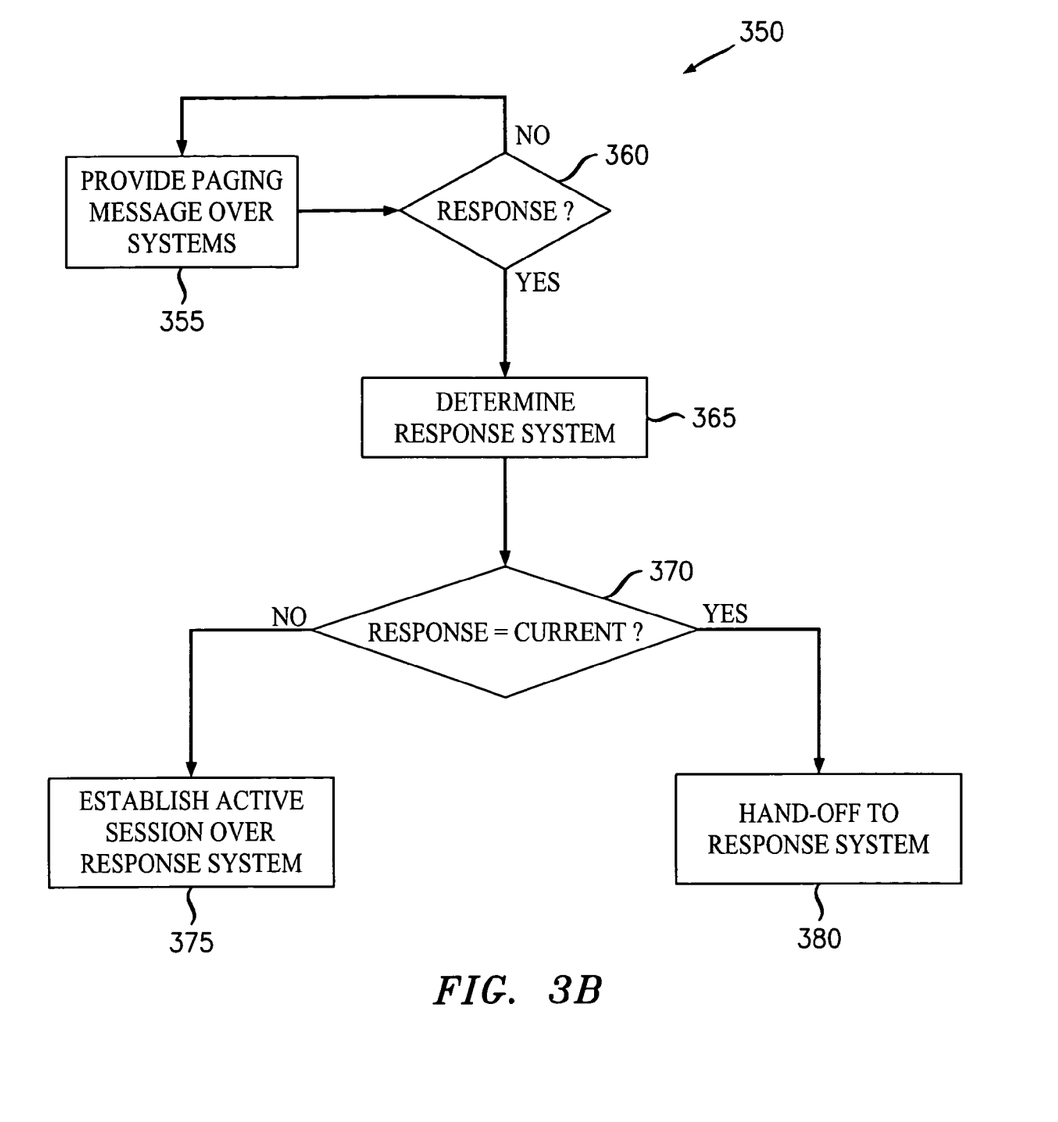
FIG. 3B conceptually illustrates a second exemplary embodiment of a method for paging an idle mobile unit, in accordance with the present invention.

FIG. 3B conceptually illustrates a second exemplary embodiment of a method 350 for paging an idle mobile unit. In the illustrated embodiment, paging messages are provided (at 355) by to wireless communication systems that operate according to different radio interface technologies. The idle mobile unit context and/or tracking area identifiers associated with each of the wireless communication systems are used to determine the tracking areas for the page (at 355) of the idle mobile unit. The wireless communication systems then determine (at 360) whether a response has been received from the idle mobile unit, e.g. using one or more timers. If no response is received (at 360), and the wireless communication systems may provide (at 355) additional paging messages via other tracking areas that are determined based upon the last-reported tracking areas. If a response to the paging messages is received (at 360), and the idle mobile unit requests establishment of resources for an active session with one of the wireless communication systems, then the wireless communication system that is used to request establishment of resources is determined (at 365).

If the responding wireless communication system is determined (at 370) to be the same as the wireless communication system that is currently storing the context of the mobile unit, then the requested active session may be established (at 375) over the responding wireless communication system. For example, the requested active session may be established (at 375) using system specific procedures associated with the responding wireless communication system. If the responding wireless communication system is determined (at 370) to be the different than the wireless communication system that is currently storing the context of the mobile unit, then the session may be handed off (at 380) to the new wireless communication system. For example, a forward handoff may be triggered (at 380); e.g., by a mobile unit request or paging response in the other system.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

The invention claimed is:

1. A method of operating an idle mobile unit that is registered with first and second wireless communication systems that operate using different radio interface technologies, the method comprising:

transmitting a location update message in response to the idle mobile unit transitioning from a first tracking area associated with the second wireless communication system to a second tracking area associated with the second wireless communication system, wherein the idle mobile unit remains associated with a first tracking area associated with a first wireless communication system after transmitting the location update message so that the first and second wireless communication systems are able to page the idle mobile unit, and wherein the location update message contains an indication of the second tracking area associated with the second wireless communication system and an indication of the first tracking area associated with the first wireless communication system.

2. The method of claim 1, wherein transmitting the location update message comprises transmitting the location update message via the second wireless communication system in response to the idle mobile unit selecting a base station in the second tracking area associated with the second wireless communication system, and the method further comprises:

transmitting a request to establish an active communication link with at least one of the first and second wireless communication systems; and establishing the active communication link with at least one of the first and second wireless communication systems based on a context stored in the first and second wireless communication systems.

3. The method of claim 1, wherein transmitting the location update message comprises transmitting the location update message via the first wireless communication system in response to the idle mobile unit detecting a transition from the first tracking area associated with the second wireless communication system to the second tracking area associated with the second wireless communication system.

4. The method of claim 3, wherein the mobile unit is located in a first tracking area associated with the first wireless communication system that overlaps with portions of the first and second tracking areas associated with the second wireless communication system, and wherein transmitting the location update message comprises providing information indicative of the first tracking area associated with the first wireless communication system and the second tracking area associated with the second wireless communication system in response to the idle mobile unit detecting the transition from the first to the second tracking area associated with the second wireless communication system.

5. The method of claim 4, comprising transmitting an additional location update message in response to detecting a transition from the first tracking area associated with the first wireless communication system to a second tracking area associated with the first wireless communication system, the location update message being transmitted via the first wireless communication system and including information indicative of the second tracking area associated with the first wireless communication system and the second tracking area associated with the second wireless communication system.

6. The method of claim 5, comprising transmitting a request to establish an active communication link with at least one of the first and second wireless communication systems.

7. The method of claim 1, comprising transmitting location update messages to the first and second wireless communication systems in response to the mobile unit entering an idle mode.

8. The method of claim 1, wherein the location update message further comprises an indication of the first tracking area associated with the second wireless communication system.

9. The method of claim 8, wherein said indication of the first tracking area associated with the second wireless communication system is an identifier included in the location update message.

10. The method of claim 1, wherein said indication of the first tracking area associated with the first wireless communication system is an identifier included in the location update message.

11. A method of paging an idle mobile unit that is registered with first and second wireless communication systems that operate using different radio interface technologies, the method comprising:

transmitting a paging message via a first tracking area associated with the first wireless communication system and a first tracking area associated with the second wireless communication system, wherein said first tracking areas associated with the first and second wireless communication systems are both indicated in a single location update message provided by the idle mobile unit in response to the idle mobile unit transitioning to the first tracking area associated with the second wireless communication system.

12. The method of claim 11, comprising receiving a request to establish an active communication link with the first or second wireless communication systems, the request being received from the idle mobile unit in response to transmitting the paging message, wherein receiving the request comprises receiving the request via either the first wireless communication system or the second wireless communication system, and further comprising:

establishing the active communication link with the mobile unit using the wireless communication system that communicated the request to establish the active communication link, the active communication link being established using a mobile unit context stored on this wireless communication system; and removing a mobile unit context stored on the other wireless communication system.

13. The method of claim 12, wherein the idle mobile unit has selected a base station of the first wireless communication system, and wherein receiving the request comprises receiving the request via either the first or second wireless communication system, and further comprising:

establishing the active communication link with the mobile unit over the first wireless communication system in response to receiving the request via the first wireless communication system; and handing off the idle mobile unit to the second wireless communication system in response to receiving the request via the second wireless communication system and establishing the active communication link with the mobile unit over the second wireless communication system.

14. The method of claim 11, wherein the single location update message provided by the idle mobile unit further comprises an indication of a second tracking area associated with the second wireless communication system.

15. The method of claim 14, wherein said indication of the second tracking area associated with the second wireless communication system is an identifier included in the location update message.

16. The method of claim 11, wherein said indication of the first tracking area associated with the first wireless communication system is an identifier included in the location update message.

17. A method of operating an idle mobile unit that is registered with first and second wireless communication systems that operate using different radio interface technologies, the method comprising:

transmitting a location update message in response to the idle mobile unit transitioning between tracking areas both of which are associated with only one of the first or second wireless communication systems, wherein the idle mobile unit remains associated with a tracking area that is associated with the other one of the first and second wireless communication systems and the location update message indicates both of the tracking area transitioned-to and the tracking area associated with the other of the first and second wireless communication systems.

18. The method of claim 17, wherein transmitting the location update message comprises transmitting the location update message via the one of the first and second wireless communication systems in response to the idle mobile unit camping in a tracking area associated with the one of the first and second wireless communication systems, and further comprising:

transmitting a request to establish an active communication link with either of the first and second wireless communication systems; and establishing an active communication link with a wireless communication system indicated in the request based on a context stored in the wireless communication system indicated in the request.

19. A method of operating an idle mobile unit that is registered with a first wireless communication system that operates using a second generation (2G)/third-generation (3G) radio interface technology and a second wireless communication system that operates using a Long Term Evolution (LTE)/System Architecture Evolution (SAE) radio interface technology, the method comprising:

transmitting a location update message in response to the idle mobile unit transitioning between tracking areas both of which are associated with only one of the first or second wireless communication systems, and wherein the location update message contains at least indications of the tracking area transitioned-to and the tracking area associated with the other of the first and second wireless communication systems.

20. The method of claim 10, wherein the idle mobile unit remains associated with a tracking area associated with the other of the first and second wireless communication systems after transmitting the location update message.

21. The method of claim 19, wherein transmitting the location update message comprises transmitting the location update message via the one of the first and second wireless communication systems in response to the idle mobile unit camping in a tracking area associated with the one of the first and second wireless communication systems, and further comprising:

transmitting a request to establish an active communication link with either of the first and second wireless communication systems; and establishing the active communication link with a wireless communication system indicated in the request based on a context stored in the wireless communication system indicated in the request.

22. A mobile unit configured to transmit a location update message while the mobile unit is in an idle mode, wherein the mobile unit is registered with both of first and second wireless communication systems each of which operates using a different radio interface technology, wherein the mobile unit transmits the location update message in response to the mobile unit in the idle mode transitioning from a first tracking area associated with the second wireless communication system to a second tracking area associated with the second wireless communication system, wherein the mobile unit in the idle mode remains associated with a first tracking area associated with the first wireless communication system and the second tracking area associated with the second wireless communication system after transmitting the location update message, and wherein the location update message and indicates the second tracking area associated with the second wireless communication system and the first tracking area associated with the first wireless communication system.

23. The mobile unit of claim 22, wherein the mobile unit is configured to transmit the location update message via the second wireless communication system in response to the mobile unit in the idle mode selecting a base station in the second tracking area associated with the second wireless communication system, and wherein the mobile unit is further configured to:

transmit a request to establish an active communication link with at least one of the first and second wireless communication systems; and establish an active communication link with at least one of the first and second wireless communication systems based on a context stored in the first and second wireless communication systems.

24. The mobile unit of claim 22, wherein the mobile unit is configured to send the location update message via the first wireless communication system in response to the mobile unit in the idle mode detecting a transition from the first tracking area associated with the second wireless communication system to the second tracking area associated with the second wireless communication system.

25. The mobile unit of claim 22, wherein the mobile unit is configured to transmit location update messages to the first and second wireless communication systems in response to the mobile unit entering the idle mode.

26. The mobile unit of claim 22, wherein the different radio interface technologies comprise a second generation (2G)/third-generation (3G) wireless communication system and a Long Term Evolution (LTE)/System Architecture Evolution (SAE) wireless communication system.

27. The mobile unit of claim 22, wherein the location update message indicates the first tracking area associated with the second wireless communication system.

28. The method of claim 27, wherein the location update message indicates the first tracking area associated with the second wireless communication system using an identifier included in the location update message.

29. The method of claim 22, wherein the location update message indicates the first tracking area associated with the first wireless communication system using an identifier included in the location update message.

30. A mobile station for use in an environment in which a mobile station in idle mode is concurrently recognized in both two different wireless communication systems during a period of time, wherein one of said wireless communication systems uses a second generation (2G)/third-generation (3G) radio interface technology and the other of said wireless communication systems uses Long Term Evolution (LTE)/System Architecture Evolution (SAE), and wherein a mobile station remains registered in a first tracking area of a first of said wireless communication systems after transitioning while in idle mode from a first tracking area of a second of said wireless communication systems to a second tracking area of said second of said wireless communication systems, the mobile station being configured to:

transmit a location update message upon transitioning from said first tracking area of said second of said wireless communication systems to the second tracking area of said second of said wireless communication systems, said location update message indicating both the second tracking area associated with the second of the wireless communication systems and the first tracking area associated with the first of said wireless communication system.

31. The mobile station of claim 30, wherein said location update message indicates the first tracking area associated with the second of the wireless communication systems.

32. The method of claim 31, wherein the location update message indicates the first tracking area associated with the second of the wireless communication systems using an identifier included in the location update message.

33. The method of claim 30, wherein the location update message indicates the first tracking area associated with the first of the wireless communication systems using an identifier included in the location update message.

34. A first base station configured to page an idle mobile unit via a tracking area associated with a first wireless communication system substantially concurrently with paging of the idle mobile unit by a second base station that is part of a tracking area associated with a second wireless communication system, wherein the first and second wireless communication systems operate using different radio interface technologies and the idle mobile unit is registered with both the first and second wireless communication systems, and wherein said tracking area associated with the first wireless communication system and said tracking area associated with the second wireless communication system were both indicated in a single received location update message.

35. The first base station of claim 34, wherein the single received location update message is transmitted by the idle mobile unit in response to the idle mobile unit transitioning to the tracking area associated with the second wireless communication system.

36. The first base station of claim 34, wherein the first base station is configured to receive a request to establish an active communication link with the first wireless communication system from the idle mobile unit in response to the first base station paging the idle mobile unit, and wherein the first base station is configured to establish the active communication link with the mobile unit using a first mobile unit context stored on the first wireless communication system, and wherein a second mobile unit context stored on the second wireless communication system is removed in response to establishing the active communication link.

37. The first base station of claim 34, wherein the first base station operates according to a 2G/3G radio interface technology or a Long Term Evolution (LTE)/System Architecture Evolution (SAE) radio interface technology and the second base station operates according to the other of the LTE/SAE radio interface technology or the 2G/3G radio interface technology.

38. A mobile unit configured to register with first and second wireless communication systems that operate using different radio interface technologies, wherein the mobile unit is configured to transmit a location update message when the mobile unit is in an idle mode in response to the idle mobile unit transitioning between tracking areas associated with one of the first or second wireless communication systems, and wherein the idle mobile unit remains associated with a tracking area that is part of the other one of the first and second wireless communication systems after transmitting the location update message and the location update message indicates the tracking area transitioned-to and the tracking area associated with said other of the first and second wireless communication systems.

39. The mobile unit of claim 38, wherein the mobile unit is configured to transmit the location update message via said one of the first and second wireless communication systems in response to the idle mobile unit selecting a base station in a tracking area associated with said one of the first and second wireless communication systems, and wherein the mobile unit is further configured to:

transmit a request to establish an active communication link with either of the first and second wireless communication systems; and     establish the active communication link with a wireless communication system indicated in the request based on a context stored in the wireless communication system indicated in the request.

40. A mobile unit configured to register with first and second wireless communication systems that operate using different radio interface technologies, wherein the mobile unit is configured to transmit, when it is in idle mode, a location update message in response to the mobile unit transitioning between tracking areas both of which are associated with only one of the first or second wireless communication systems, the message indicating the tracking area transitioned-to and the tracking area that is part of the other one of the first and second wireless communication systems and being adapted for use by the first and second communication systems to keep the idle mobile unit associated with both of the tracking areas that are located in the location update message after transmission of the location update message.

41. A mobile unit configured to register with a first wireless communication system that operates using a second generation (2G)/third-generation (3G) radio interface technology and a second wireless communication system that operates using a Long Term Evolution (LTE)/System Architecture Evolution (SAE) radio interface technology, wherein the mobile unit is further configured to:

transmit a location update message when operating in an idle mode, and wherein the location update message is transmitted in response to the idle mobile unit transitioning between two tracking areas that are both associated with only one of the first or second wireless communication systems, wherein the location update message is adapted for use by the first and second communication systems to keep the idle mobile unit associated with the tracking area transitioned-to and a tracking area associated with the other one of the first and second wireless communication systems after transmitting the location update message and the location update message indicates the tracking area transitioned-to and the tracking area associated with said other one of the first and second wireless communication systems.

42. The mobile unit of claim 41, wherein the mobile unit is configured to transmit the location update message via said one of the first and second wireless communication systems in response to the idle mobile unit camping in a tracking area associated with said one of the first and second wireless communication systems, and wherein the mobile unit is further configured to:
 transmit a request to establish an active communication link with either of the first and second wireless communication systems; and
  establish the active communication link with a wireless communication system indicated in the request based on a context stored in the wireless communication system indicated in the request.

43. A first base station configured for implementation in a first wireless communication system that operates using a second generation (2G)/third-generation (3G) radio interface technology, wherein the first base station is configured to page an idle mobile unit that is registered with the first wireless communication system and a second wireless communication system that operates using a Long Term Evolution (LTE)/System Architecture Evolution (SAE) radio interface technology, and wherein the first base station is configured to page the idle mobile unit substantially concurrently with a second base station paging the idle mobile unit, and wherein the second base station is implemented in the second wireless communication system that operates according to the LTE/SAE radio interface technology, and wherein tracking areas associated with the first and second wireless communication systems are both indicated in a single location update message provided by the idle mobile unit in response to the idle mobile unit transitioning between tracking areas associated with at least one of the first and second wireless communication systems.

44. A first base station configured for implementation in a first wireless communication system that operates using a Long Term Evolution (LTE)/System Architecture Evolution (SAE) radio interface technology, wherein the first base station is configured to page an idle mobile unit that is registered with the first wireless communication system and a second wireless communication system that operates using a second generation (2G)/third-generation (3G) radio interface technology, and wherein the first base station is configured to page the idle mobile unit substantially concurrently with a second base station paging the idle mobile unit, and wherein the second base station is implemented in the second wireless communication system that operates according to the 2G/3G radio interface technology, and wherein tracking areas associated with the first and second wireless communication systems are both indicated in a single location update message provided by the idle mobile unit in response to the idle mobile unit transitioning between tracking areas associated with at least one of the first and second wireless communication systems.

* * * * *